Aug. 28, 1945. P. E. WILCOX 2,383,755
REFACING OF VALVE GATES
Filed Dec. 1, 1944 3 Sheets-Sheet 1
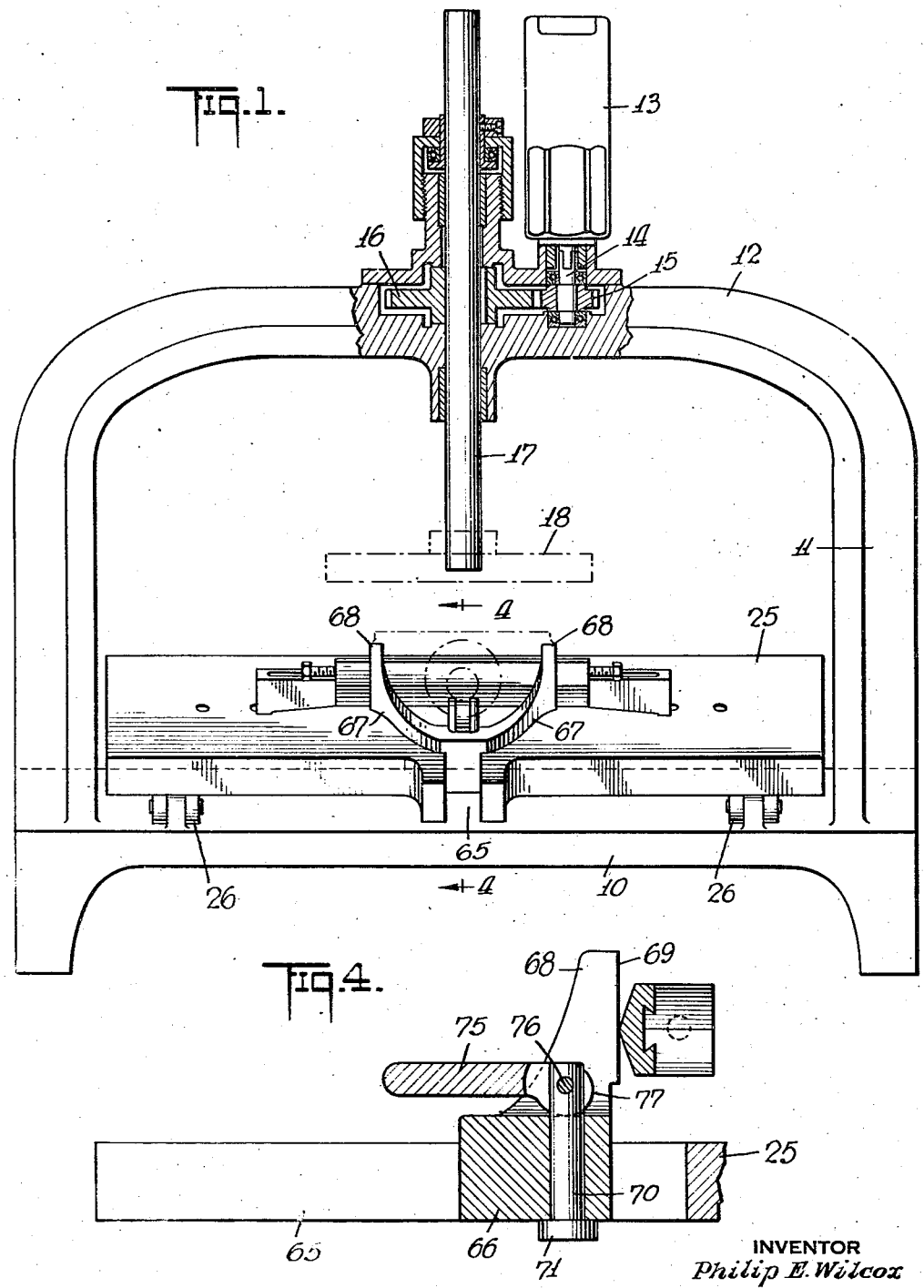
INVENTOR
Philip E. Wilcox
BY
ATTORNEY Aug. 28, 1945.   P. E. WILCOX   2,383,755
REFACING OF VALVE GATES
Filed Dec. 1, 1944   3 Sheets-Sheet 2
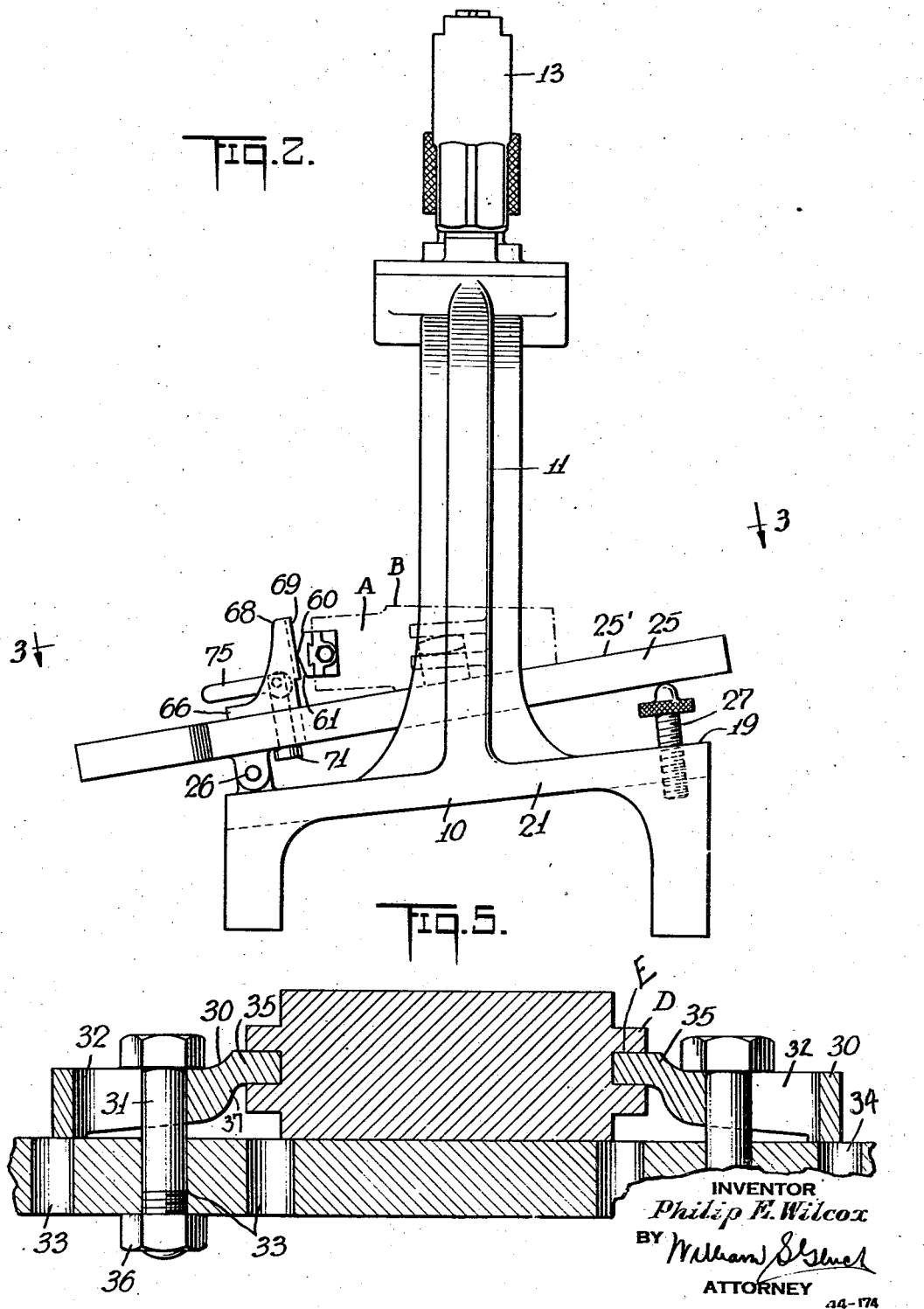
INVENTOR
Philip E. Wilcox
BY
ATTORNEY Aug. 28, 1945.                    P. E. WILCOX                    2,383,755
                            REFACING OF VALVE GATES
                            Filed Dec. 1, 1944                3 Sheets-Sheet 3
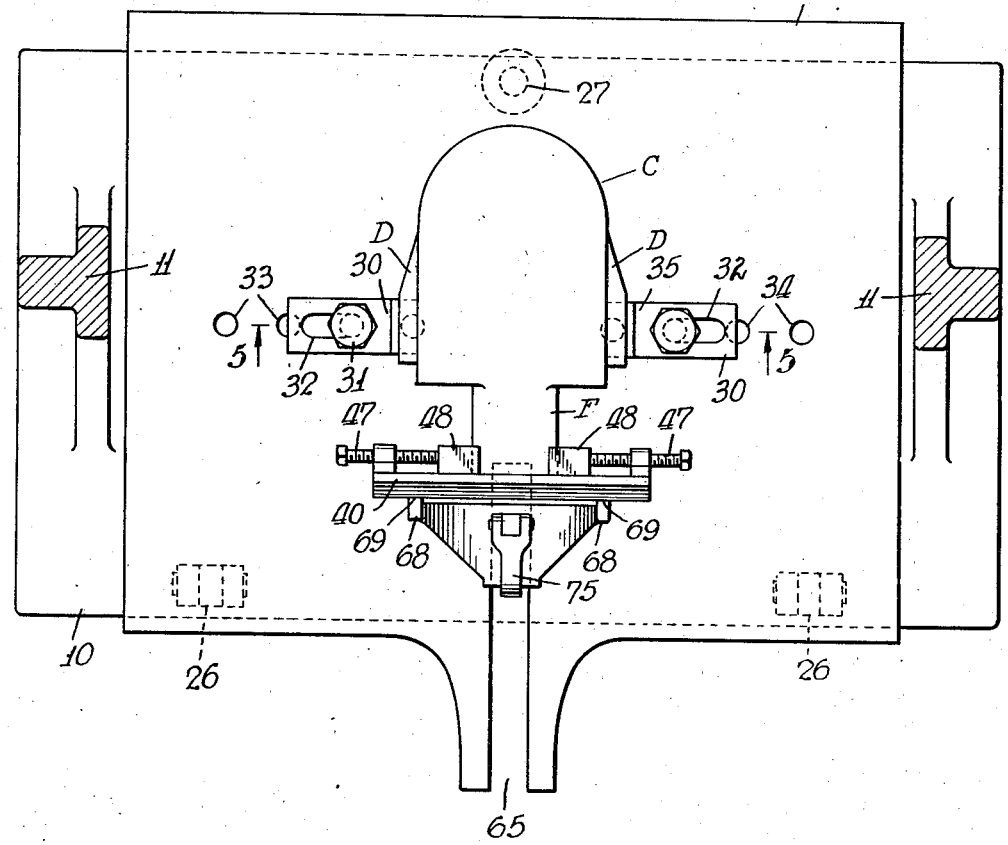
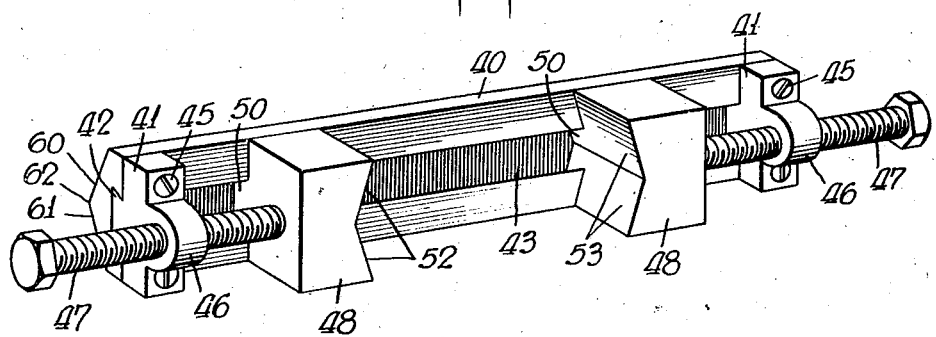
INVENTOR
Philip E. Wilcox
BY
ATTORNEY Patented Aug. 28, 1945

2,383,755

UNITED STATES PATENT OFFICE 2,383,755

REFACING OF VALVE GATES

Philip E. Wilcox, New York, N. Y., assignor to The Leavitt Machine Company, Orange, Mass., a corporation of Massachusetts Application December 1, 1944, Serial No. 566,166

6 Claims. (Cl. 51—125)

This invention relates generally to an apparatus for facing off the gate or plug of a gate valve.

A general object of the invention is an improved arrangement for supporting the gate of such valve for and during the facing off operation.

Another object of my invention is an improved arrangement whereby both surfaces of a gate can be ground or faced off to the same angle.

Another object of my invention is an improved and simplified arrangement whereby the gate can be adjusted to a predetermined spatial relation to the cutter and maintained in that relation during the facing off operation.

My arrangement contemplates that the gate be supported to present only one surface to the cutter and that the gate be reversed to present the other surface thereto. A further object of my invention is an arrangement for registering the gate and the cutter whose adjustment remains undisturbed during the reversal, whereby both surfaces can be faced off to the same degree or angle.

For the attainment of these objects and such other objects as may hereinafter appear or be pointed out I have illustrated an embodiment of my invention in the drawings wherein—

Figure 1 is a front elevational view, partly in section, of this embodiment;

Figure 2 is a side elevational view thereof;

Figure 3 is a view taken along the lines 3—3 of Figure 2 looking in the direction of the arrows;

Figure 4 is a vertical section taken on line 4—4 of Figure 1;

Figure 5 is a section taken on line 5—5 of Figure 3; and

Figure 6 is a perspective on an enlarged scale of a portion of the apparatus.

Upon viewing Figure 1 of the drawings, it will be observed that the apparatus is mounted upon a base 10 supported from the floor or other base. Projecting upwardly from the opposite sides of this platform is the support for the grinding apparatus. This support is shown in Figure 1 as in the form of an arch comprised of the spaced apart upwardly extending legs 11 joined across the top by the portion 12 from the middle of which are carried the cutter and the mechanism which operates it. This mechanism may be of any desired or preferred character. It has been illustrated in Figure 1, for example, as comprising the member 13 which may itself be a prime mover or merely a shaft coupling to a prime mover, to rotate the drive shaft 14 which carries gear 15 in mesh with gear 16 which in turn carries the cutter shaft 17. The cutter head 18 has been shown diagrammatically in the drawings because it may be of any preferred or desired character. It will suffice to state that it is secured to depend from the lower end of shaft 17 to engage with and grind a surface of the gate positioned therebelow. It will be understood that the apparatus thus far described for mounting and operating the cutting tool is for illustrative purposes.

Before describing my invention I will premise that a typical gate is generally defined by two faces or surfaces which contact with and seat against the seats of the gate valve to complete the valve closure and that these two gate faces are generally at an angle to each other and that the accuracy with which these surfaces are each faced to engage its valve seat determines the effectiveness of the seal.

My invention contemplates that but one of the surfaces of the gate be presented to the cutting tool in predetermined relation thereto for refinishing that surface to the proper angle and that the gate be turned 180° to present its other surface to the cutter in precisely the same relation so that it too will be refinished precisely to that angle or degree. The two gate surfaces thus refinished will consequently properly engage the two seats of the valve which are presumed to have been likewise ground to this degree or angle.

Such typical gate valve is shown in dot and dash line at "A" in Figure 2 of the drawings. It is shown in position for the facing off of the surface which is presented uppermost, by the cutter 18 depending from shaft 17. I have applied the reference character "B" to this surface so presented for facing off.

I will first describe an arrangement whereby this surface B can be adjusted to and maintained in the desired angularity, and I here premise that the disclosed embodiment is predicated upon the adjustment of this surface B to the horizontal and its maintenance therein.

The arrangement contemplates that the base 10 (supported as aforementioned) have its upper surface 19 inclined (see Figure 2) for reasons that will be pointed out. This inclination is effected in the disclosed embodiment by having the top 21 of the base 10 correspondingly inclined. For convenience of reference this inclination will be defined and referred as it is shown in Figure 2 wherein the lowermost surface level is at the extreme left and the highest level at the extreme right, the level rising gradually from the former to the latter.

A gate supporting platform 25 is mounted above the top 21 of the base 10. This mounting is shown in Figure 2 as pivotal in character. It comprises an ear or ears extending upwardly from the surface 19 and cooperating overlapping ears extending downwardly from the platform 25 said ears being connected by a pivot pin 26 passed therethrough, as a result of which the platform 25 is free to pivot or swing about a horizontal axis. This pivotal mounting at 26 is shown at the extreme left end of top 21 and therefore at the lowermost level and connected at that end to the platform 25 adjacent its left end. This arrangement permits of adjustment in the angularity of the platform 25 and of its gate supporting surface 25' by raising and lowering the other or right end of platform 25 for which purpose I provide a member 27 whose lower end is threaded into base 10 and whose upper end engage under the upper or right end (Figure 2) of the platform 25. It will be observed that in this arrangement, the surface 25' can be maintained always angled in the proper direction and that the only adjustment required is that effected by the member 27.

I will now explain my arrangement whereby the gate may be located on this platform 25 in predetermined registration with and below the cutter and held against shifting. Before doing so, I will premise that this arrangement avails itself of the fact that the gate supporting surface 25' is inclined and that therefore the gate will tend to gravitate down the incline and the further facts that a gate of this type generally comprises the head C of relatively larger dimensions from which projects to the rear the tail F of relatively smaller dimensions and to the side fins or flanges D grooved, as shown in Figure 5 at E.

Reference will now be had to Figure 5 wherein members 30 are shown as held to the platform 25 by headed bolts 31 which pass therethrough and through elongated slots 32 formed in said members 30. It will be observed that the platform 25 is provided with two sets 33 and 34 of three openings each, so that each bolt can be received through any selected one of three openings. The members 30 each has the inwardly projecting and somewhat elevated finger 35 dimensioned and contoured to fit into one of the grooves E formed in the fins of side members D of the gate. These fingers 35 hold the gate to a movement along the incline i. e. to the right or the left in Figure 2. The combination of the elongated slots 32 in the members 30 and the sets of openings 33 and 34 permits the members 30 to have a wide range of adjustment to accommodate gates of different sizes. Adjustment of nuts 36 will jam the fingers 35 to the gate. These members 30 are cut away as shown at 37 to permit this jamming action. This arrangement thus fixes the gate against any lateral or angular movement and when the fingers 35 are not in jamming engagement permits longitudinal movement along the incline, and I will now describe my arrangement for fixing the position of the gate longitudinally of the inclined surface 25'.

Reference being first had to the assembly shown in Figure 6 which forms part of such arrangement. This assembly comprises the elongated base member 40 to the ends of which are secured the end members 41 dovetailed at 42 into the correspondingly shaped slot 43 in the rear of base member 40. Members 42 are fixed or secured to the end of base member 40 in any preferred or desired manner as by screws 45. These members 41 have threaded openings through flanges 46 which project therefrom oppositely to the dovetailed portions 42, which openings receive members 47 threaded therethrough. These members 47 each carry a chuck or block 48 having flanges 50 which dovetail into the groove 43 of base member 40. These blocks or chucks 48 have their opposing surfaces 52 and 53 conformed, as shown so as to cooperate effectively with the correspondingly contoured side walls of the tail F of the gate.

Upon reference to Figures 2 and 6, it will be observed that the outer surface of the base member 40 of the chuck assembly of Figure 6 is comprised of two angularly positioned faces 60 and 61 which intersect in the horizontal line 62 and define an edge at the extreme left in the showing of Figure 2.

The assembly of Figure 6 is engaged with the end of the tail F in the manner shown in Figure 3 of the drawings wherein the inner surface of the base member 40 is brought against the end of the tail with the blocks 48 to opposite sides thereof. The members 47 are then adjusted to cause the surfaces 52 and 53 of these blocks to engage with the adjacent surfaces at the sides of the tail F to thus secure the assembly of Figure 6 to this tail in the position and relation shown in Figures 2 and 3.

My invention contemplates that the assembly of Figure 6 remains attached to the end of the tail F of the gate during the grinding operation to function as I will now set forth. The rear or lower end of the platform 25 is slotted centrally and longitudinally as shown at 65 in Figures 1, 3 and 4, to receive block 66 which is adjustable along the length of the slot. Extending upwardly from the block 66 is a yoke comprised of the spaced apart upwardly directed arms 67 each of which terminates in the abutment member 68 the structure or characteristics of which will be understood by a comparison of the showings thereof in Figures 1, 2 and 4. These abutment members 68 each presents an abutment face 69 the height and length of which may be as desired, the showing in Figures 1, 2 and 4 having proved satisfactory. The block 66 is held in the position to which it has been adjusted in any preferred or desired manner as by the headed pin 70 which extends through the block 66 with the head 71 of the pin engaged with the under surface of the platform 25 to each side of slot 65. To the upper end of this pin is pivoted the camming member 75 the pivot being shown at 76 and the camming face at 77. When the yoke including the block 66 has been adjusted to its desired position the camming member, which during this adjustment is positioned vertically, is swung counterclockwise to its position of Figure 4 to lock the block 66 and the yoke carried thereby in that adjusted position.

Upon viewing Figure 2 it would be observed that the gate A with the assembly of Figure 6 affixed thereto is in position on platform 25 with edge 62 at the extreme left of the assembly in abutting relation to the aforementioned abutment surfaces 69. This limits the movement of the gate down the incline.

When gate A is to be faced, the assembly of Figure 6 is affixed to the tail F thereof and the gate placed on the platform 25 with the assembly of Figure 6 facing to the left in the showing of Figure 2. The block 66 is adjusted as aforementioned to bring the limiting surfaces 69 to their predetermined position. The members 30 and the gate are adjusted to cause fingers 35 to engage in grooves E and the edge 62 to engage faces 69. The members 30 are then locked by adjustment of bolts 31 in nuts 36. The upper surface of the gate will thus have been located linearly and angularly into registration with the cutter 18 and the refinishing or resurfacing operation then performed. The order in which these adjustments have been enumerated is not intended as the order in which they are to be performed.

It will be observed that the tendency of the gate to move down the incline is availed of by my invention to bring it into and to maintain it in abutting relation to the spaced abutment surfaces 69 which serve additionally to maintain the alignment of the gate.

Another stated object of my invention is that the arrangement is such that after one surface of the gate has been faced to the desired degree or angle, the other surface of the gate may be ground to the same degree or angle. This I attain as follows: The holding fingers 30 (see Figure 5) are released and the gate reversed to bring its lower surface uppermost. In this reversal the assembly of Figure 6 remains fixed to the gate and the abutting surfaces 69 are held in the position to which they have been adjusted. The members 30 are then adjusted to reengage in the slot E at the sides of the gate (see Figure 5) and the gate then moved or gravitated to bring edge 62 of the assembly of Figure 6 against the two spaced abutment surfaces 69. The fingers 35 are then again locked in their engagement in grooves E. The other surface of the gate will thus be presented to the cutter in an identical relation so that it will be refaced to identically the same degree and angle.

Having thus described my invention what I claim and desire to secure by Letters Patent is:

1. In combination with a cutter and means for rotating it about a vertical axis to cut in a horizontal plane, means for presenting the two angular faces of a wedge shaped valve gate successively uppermost and each in a horizontal plane for a refacing operation by said cutter, said last mentioned means comprising a base having its upper surface angularly disposed in the direction of its length and a platform supported from and above said base to swing about a horizontal axis which extends transversely of a lower level of said upper inclined surface of the base, said platform extending in the direction of the higher level of said base so as to present its upper surface at a minimum angle which equals that of the upper surface of the base, and adjustable means for variably increasing the angularity of the upper surface of the platform beyond said minimum whereby a wedge shaped gate with one face seated on the inclined surface of the platform with its tail lowermost, will present its other surface uppermost and more closely to the horizontal to which it can be adjusted for resurfacing by adjustment of said adjustable means, and whereby merely reversing the valve gate to bring its other face uppermost without any other change in the positional relation of the valve gate to the cutter, will present the other face uppermost for a substantially identical resurfacing of that face.

2. In combination with a cutter and means for rotating it about a vertical axis to cut in a horizontal plane, means for presenting the two angular faces of a wedge shaped valve gate successively uppermost and each in a horizontal plane for a refacing operation by said cutter, said last mentioned means comprising a base having its upper surface angularly disposed in the direction of its length and a platform supported from and above said base to swing about a horizontal axis which extends transversely of a lower level of said upper inclined surface of the base, said platform extending in the direction of the higher level of said base so as to present its upper surface at a minimum angle which equals that of the upper surface of the base, and adjustable means for variably increasing the angularity of the upper surface of the platform beyond said minimum whereby a wedge shaped gate with one face seated on the inclined surface of the platform with its tail lowermost, will present its other surface uppermost and more closely to the horizontal to which it can be adjusted for resurfacing by adjustment of said adjustable means, and whereby merely reversing the valve gate to bring its other face uppermost without any other change in the positional relation of the valve gate to the cutter, will present the other face uppermost for a substantially identical resurfacing of that face and a limit stop on said platform adapted to be engaged by the tail end of the valve gate for predetermining the same bodily position of the gate longitudinally of said surface, regardless of which of its faces is uppermost.

3. In combination with a cutter and means for rotating it about a vertical axis to cut in a horizontal plane, means for presenting the two angular faces of a wedge shaped valve gate successively uppermost and each in a horizontal plane for a refacing operation by said cutter, said last mentioned means comprising a base having its upper surface angularly disposed in the direction of its length and a platform supported from and above said base to swing about a horizontal axis which extends transversely of a lower level of said upper inclined surface of the base, said platform extending in the direction of the higher level of said base so as to present its upper surface at a minimum angle which equals that of the upper surface of the base, and adjustable means for variably increasing the angularity of the upper surface of the platform beyond said minimum whereby a wedge shaped gate with one face seated on the inclined surface of the platform with its tail lowermost, will present its other surface uppermost and more closely to the horizontal to which it can be adjusted for resurfacing by adjustment of said adjustable means, and whereby merely reversing the valve gate to bring its other face uppermost without any other change in the positional relation of the valve gate to the cutter, will present the other face uppermost for a substantially identical resurfacing of that face and means on the platform for engaging the sides of the valve gate for predetermining the same bodily position of the gate transversely of said platform, regardless of which of its faces is uppermost.

4. In combination with a cutter and means for rotating it about a vertical axis to cut in a horizontal plane, means for presenting the two angular faces of a wedge shaped valve gate successively uppermost and each in a horizontal plane for a refacing operation by said cutter, said last mentioned means comprising a base having its upper surface angularly disposed in the direction of its length and a platform supported from and above said base to swing about a horizontal axis which extends transversely of a lower level of said upper inclined surface of the base, said platform extending in the direction of the higher level of said base so as to present its upper surface at a minimum angle which equals that of the upper surface of the base, and adjustable means for variably increasing the angularity of the upper surface of the platform beyond said minimum whereby a wedge shaped gate with one face seated on the inclined surface of the platform with its tail lowermost, will present its other surface uppermost and more closely to the horizontal to which it can be adjusted for resurfacing by adjustment of said adjustable means, and whereby merely reversing the valve gate to bring its other face uppermost without any other change in the positional relation of the valve gate to the cutter, will present the other face uppermost for a substantially identical resurfacing of that face and a limit stop on said platform adapted to be engaged by the tail end of the valve gate for predetermining the same bodily position of the gate longitudinally of said surface, regardless of which of its faces is uppermost and means on the platform for engaging the sides of the valve gate for predetermining the same bodily position of the gate transversely of said platform, regardless of which of its faces is uppermost.

5. In combination with a cutter and means for rotating it about a vertical axis to cut in a horizontal plane, means for presenting the two angular faces of a wedge shaped valve gate successively uppermost and each in a horizontal plane for a refacing operation by said cutter, said last mentioned means comprising a base having its upper surface angularly disposed in the direction of its length and a platform supported from and above said base to swing about a horizontal axis which extends transversely of a lower level of said upper inclined surface of the base, said platform extending in the direction of the higher level of said base so as to present its upper surface at a minimum angle which equals that of the upper surface of the base, and adjustable means for variably increasing the angularity of the upper surface of the platform beyond said minimum whereby a wedge shaped gate with one face seated on the inclined surface of the platform with its tail lowermost, will present its other surface uppermost and more closely to the horizontal to which it can be adjusted for resurfacing by adjustment of said adjustable means, and whereby merely reversing the valve gate to bring its other face uppermost without any other change in the positional relation of the valve gate to the cutter, will present the other face uppermost for a substantially identical resurfacing of that face and means on the platform for engaging the sides of the valve gate for predetermining the same bodily position of the gate transversely of said platform, regardless of which of its faces is uppermost and for guiding said valve gate in its movement longitudinally of the platform surface.

6. In combination with a cutter and means for rotating it about a vertical axis to cut in a horizontal plane, means for presenting the two angular faces of a wedge shaped valve gate successively uppermost and each in a horizontal plane for a refacing operation by said cutter, said last mentioned means comprising a base having its upper surface angularly disposed in the direction of its length and a platform supported from and above said base to swing about a horizontal axis which extends transversely of a lower level of said upper inclined surface of the base; said platform extending in the direction of the higher level of said base so as to present its upper surface at a minimum angle which equals that of the upper surface of the base, and adjustable means for variably increasing the angularity of the upper surface of the platform beyond said minimum whereby a wedge shaped gate with one face seated on the inclined surface of the platform with its tail lowermost, will present its other surface uppermost and more closely to the horizontal to which it can be adjusted for resurfacing by adjustment of said adjustable means, and whereby merely reversing the valve gate to bring its other face uppermost without any other change in the positional relation of the valve gate to the cutter, will present the other face uppermost for a substantially identical resurfacing of that face and a limit stop on said platform adapted to be engaged by the tail end of the valve gate for predetermining the same bodily position of the gate longitudinally of said surface, regardless of which of its faces is uppermost and means on the platform for engaging the sides of the valve gate for predetermining the same bodily position of the gate transversely of said platform, regardless of which of its faces is uppermost and for guiding its tail into proper engagement with said limit stop.

PHILIP E. WILCOX.